US009822858B2

(12) United States Patent
Guerin (10) Patent No.: US 9,822,858 B2
(45) Date of Patent: Nov. 21, 2017

(54) ELECTRONICALLY CONTROLLED ROTATIONAL ACTUATOR WITH MANUAL OVERRIDE

(71) Applicant: Bernard Guerin, St. Petersburg, FL (US)

(72) Inventor: Bernard Guerin, St. Petersburg, FL (US)

(*) Notice: Subject to any disclaimer, the term of this patent is extended or adjusted under 35 U.S.C. 154(b) by 0 days.

(21) Appl. No.: 15/190,255

(22) Filed: Jun. 23, 2016

(65) Prior Publication Data

US 2017/0016520 A1   Jan. 19, 2017

Related U.S. Application Data (60) Provisional application No. 62/183,203, filed on Jun. 23, 2015.

(51) Int. Cl.
| | |
|---|---|
| *F16D 13/22* | (2006.01) |
| *F16H 25/20* | (2006.01) |
| *F16K 31/05* | (2006.01) |
| *F16H 57/00* | (2012.01) |

(52) U.S. Cl.
CPC ......... *F16H 25/20* (2013.01); *F16H 57/0006* (2013.01); *F16K 31/05* (2013.01); *F16H 2025/2062* (2013.01)

(58) Field of Classification Search
CPC ............... F16H 25/20; F16H 57/0006; F16H 2025/2062; F16K 31/05
See application file for complete search history.

(56) References Cited

U.S. PATENT DOCUMENTS

| | | | | |
|---|---|---|---|---|
| 8,517,883 B2* | 8/2013 | Gassmann | ............ | F16H 48/08 475/214 |
| 8,827,859 B2* | 9/2014 | Fox | ........................ | F16H 48/08 475/231 |
| 9,151,339 B2* | 10/2015 | Lee | ........................ | F16D 21/00 |
| 9,180,866 B2* | 11/2015 | Helmer | ................... | B60K 6/387 |
| 2013/0136212 A1* | 5/2013 | Shirasuka | ............ | H04N 5/4401 375/340 |

\* cited by examiner

*Primary Examiner* — David J Hlavka
(74) *Attorney, Agent, or Firm* — Maxey-Fisher, PLLC; Stephen Lewellyn (57) ABSTRACT

A motor driven valve actuator has a manual override that allows operating the valve without causing the motor rotation. The actuator includes a spindle having an axis of rotation, a driving hub rotatable about the axis of rotation, and a connecting plate attached to the spindle to be axially movable and rotatably fixed thereto, the connecting plate rotatably fixed to the driving hub when in a first axial position, thereby rotatably fixing the spindle to the driving hub for conjoined rotation with the driving hub, the connecting plate rotatable relative to the driving hub when in a second axial position.

11 Claims, 9 Drawing Sheets

ELECTRONICALLY CONTROLLED ROTATIONAL ACTUATOR WITH MANUAL OVERRIDE

CROSS-REFERENCE TO RELATED APPLICATIONS

This application claims the benefit of U.S. Provisional Application No. 62/183,203, filed Jun. 23, 2015, the entirety of which is incorporated herein by reference.

FIELD OF THE INVENTION

The present invention relates generally to valve actuators, and more particularly, relating to an electronically controlled valve actuator having a manual override.

BACKGROUND OF THE INVENTION

Conventionally, valves have a valve element that is associated with a valve seat. The valve element is moved relative to the valve seat in order to control or regulate flow through the valve. Valve actuators are known and include an electric motor that is coupled to the valve element by a gear mechanism and a spindle. The motor is operated to adjust the position of the valve element relative to the valve seat. In certain instances, it is desirable to manually operate the valve element. However, manual operation of the valve presents several challenges, including having to remove the valve actuator from the valve, causing undesirable manual rotation of the motor, or both. Accordingly, there is a desire for a valve actuator that allows manual operation of a valve to which the actuator is attached without removing the actuator or causing the motor to rotate by manual operation.

SUMMARY OF THE INVENTION

Embodiments of the present invention provide an electrically operated valve actuator that has a manual override allowing the valve to be manually operated without causing motor rotation and without disassembling the valve actuator.

In general, in one aspect, an electronically controlled rotational actuator is provided. The actuator includes a spindle having an axis of rotation, a driving hub rotatable about the axis of rotation, and a connecting plate attached to the spindle to be axially movable and rotatably fixed thereto, the connecting plate rotatably fixed to the driving hub when in a first axial position, thereby rotatably fixing the spindle to the driving hub for conjoined rotation with the driving hub, the connecting plate rotatable relative to the driving hub when in a second axial position.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DESCRIPTION OF THE INVENTION

The present invention relates to an electronically controlled rotational actuator with manual override, rotating in direction 1 and rotating in direction 2, with indicator light for each direction, more particularly the present invention relates to rotational electromechanical with manual override valve actuator.

In exemplary application, the valve actuator could be used in connection with a motor vehicle to operate a valve on a gas cylinder to deliver gas under pressure from the cylinder to the combustion engine or vehicle components. In such an application, driver would operate an electrical switch located within reach of driver to fully open and fully close the valve via the valve actuator configured to powered mode or manually open and close the valve if the actuator is configured to manual mode.

Now with reference to FIGS. 1 through 8, there is representatively illustrated a new electronically controlled electromechanical rotational actuator 1 having a manual override that is constructed in accordance with an embodiment of the present invention. The valve actuator 1 is illustrated in connection with a conventional compressed gas cylinder 2. The gas cylinder 2 is fitted with a conventional valve 3 that is operable to control a flow of compressed gas from the compressed gas cylinder 2. Valve 3 has a valve stem 5 that is rotated about axis 40 to open and close valve 3.

The rotational actuator 1 includes an adaptor plate 30 that is detachably connected to valve neck 4 of valve 3, for example, by a slip connection between cooperating surfaces 42 and 43 formed on neck 4 of valve 3 and socket 32 of adaptor plate 30, respectively. A plurality of set screws 34 may be threaded through the adaptor plate socket 32 for engagement with neck 4 of valve 3 to prevent adaptor plate 30 from rotating or sliding once connected to valve 3. Other devices could be substituted for set screws to serve the same purpose of preventing adaptor plate 30 from rotating or sliding relative to valve 3 once they are connected together. While adaptor plate 30 is illustrated here being connected to neck 4 of valve 3 by a slip connection and set screws, adaptor plate 30 could be connected to neck 4 of valve 3 by other types of coupling known in the art, serving the same purpose.

The rotational actuator 1 includes a hollow-shaft gear-motor 6 attached in this exemplary application to flange 31 of adaptor plate 30 by 4 screws insuring adaptor plate 30 and gear-motor 6 to be centered on valve axis 40. Other devices known to the art could be substituted to the screws to serve the same purpose of preventing the gear-motor 6 from rotating or translating relative to adaptor plate 30 and valve 3.

Stem 18 of spindle 16 extends through driving hub 22 and gear-motor large gear 8 of gear-motor 6 for rotation about axis 40. At end 46 of spindle 16 a socket 19 is formed through stem 18 of spindle 16 and is configured to receive the end of valve stem 5 such that when valve stem 5 is inserted into socket 19, valve stem 5 and spindle 16 are conjoined for rotation about axis 40.

In this exemplary application, a snap-ring 38 is inserted in groove 21 cut into spindle stem 18 preventing spindle 16 from sliding out of gear-motor 6 large gear 8 and driving hub 22 after assembly. Driving hub 22 is conjoined for rotation with large gear 8 of gear-motor 6 by a shock absorbing coupling 9. Driving hub 22 includes a plurality of radial tabs 23 extending outward. At its mid-section 17, the spindle 16 includes a plurality of longitudinal grooves 20. End 44 of the spindle 16 includes a plurality of radial holes housing spring-loaded balls 28.

Housing 11 fits over spindle body 17 rotating about axis 40 independently from spindle 16. At end 45 of the housing 11 there are two parallel circular grooves 13 and 14. At end 44 of the housing 11 there is a circular groove 15. Parallel to groove 15, in the direction of end 45, housing 11 includes a plurality of inward facing tabs 14. The mid-section of housing 11 includes a circular cavity housing connecting plate 24 allowing the connecting plate to rotate about axis 40 independently from housing 11.

Connecting plate 24 includes a plurality of radial inward facing tabs 25 of complementary shape of longitudinal grooves 20 cut in mid-section 17 of spindle 16 in such manner that connecting plate 24 is allowed to move along axis 40 independently from spindle 16 but conjoined for rotation about axis 40 with spindle 16. Connecting plate 24 includes a plurality of outward facing radial tabs 26 of number, shape and dimensions such that when placed in the same plane as tabs 14 housing 11, housing 11 and the connecting plate 24 are conjoined for rotation about axis 40. Connecting plate 24 includes a plurality of axial tabs 27 protruding axially from connecting plate 24 in the direction of valve 3. Tabs 27 are configured such that when they are in the same plane as tabs 23 of driving hub 22, the driving hub 22 and connecting plate 24 are conjoined for rotation. Snap ring 37 inserted in groove 15 of knob/housing 11 keeps connecting plate 24 from sliding out of housing 11.

Figure 1:
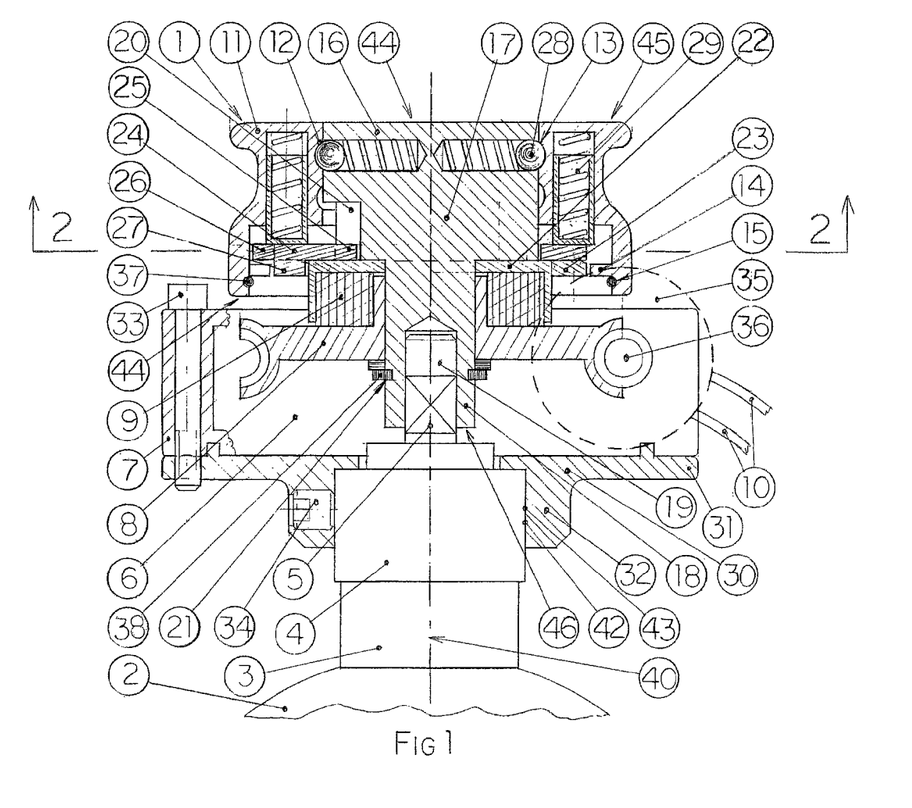
FIG. 1 is a cross-sectional view of an electronically controlled rotational actuator with manual override constructed in accordance with the principles of an embodiment of the present invention, configured in a manual override mode and in a second position.
Figure 2:
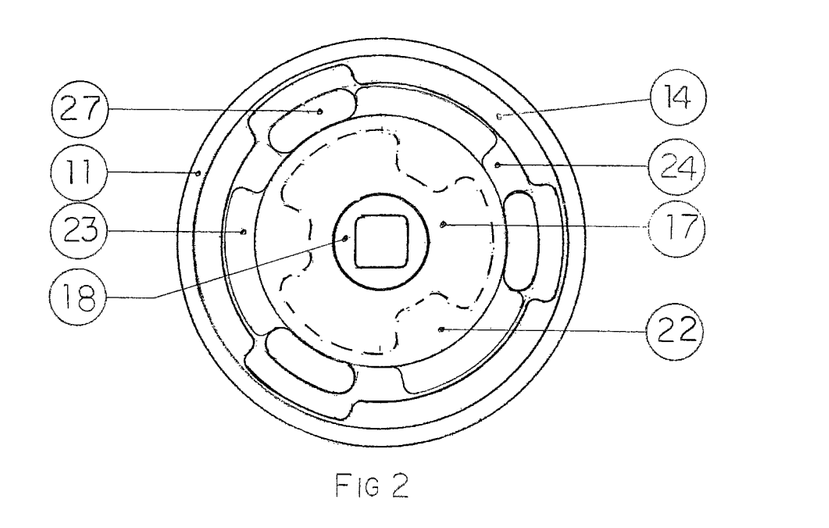
FIG. 2 is a cross-sectional view of the actuator of FIG. 1, taken generally along line 2-2.

With reference to FIGS. 1 and 2, the rotational actuator 1 is depicted in cross sectional and in manual mode configuration in a first position. Housing 11 is located in relation to spindle 16 along axis 40 by spring-loaded balls in groove 13 of the housing. In this position, tabs 14 of housing 11 and tabs 26 of connecting plate 24 are shown disengaged, before rotation of housing 11, in the process of configuring the unit from electrically powered mode to manual mode.

Figure 3:
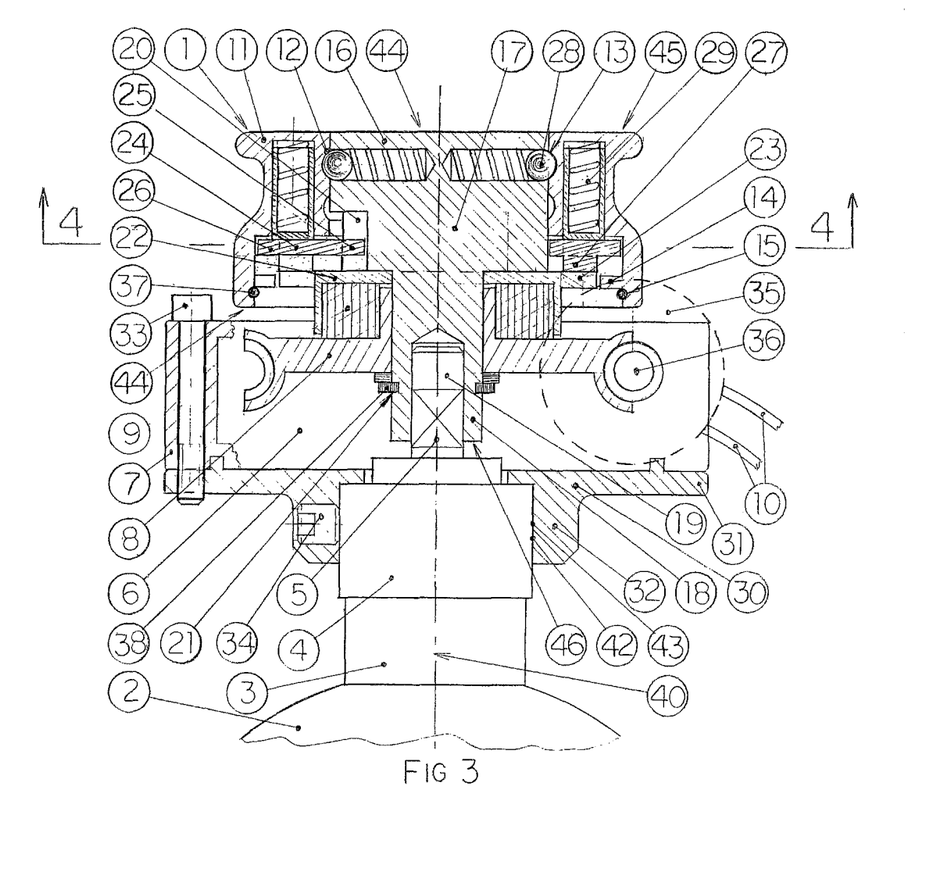
FIG. 3 is a cross-sectional view of an electronically controlled rotational actuator with manual override constructed in accordance with the principles of an embodiment of the present invention, configured in a manual override mode and in a first position.
Figure 4:
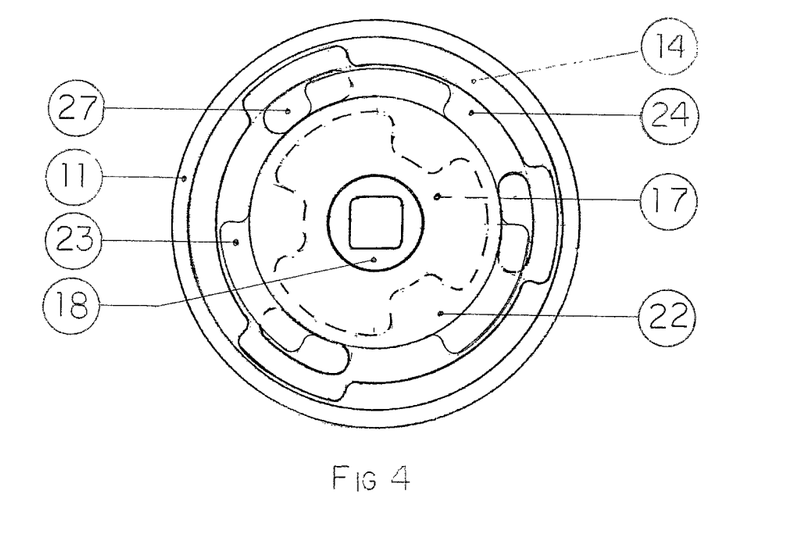
FIG. 4 is a cross-sectional view of the actuator of FIG. 3, taken generally along line 3-3.

With reference to FIGS. 3 and 4, the rotational actuator 1 is depicted in cross sectional and in manual mode configuration in a second position. In this position, tabs 14 of housing 11 and tabs 26 of connecting plate 24 are shown engaged. In this configuration, torque applied to knob 11 is transmitted to spindle 16 via connecting plate 24.

Figure 5:
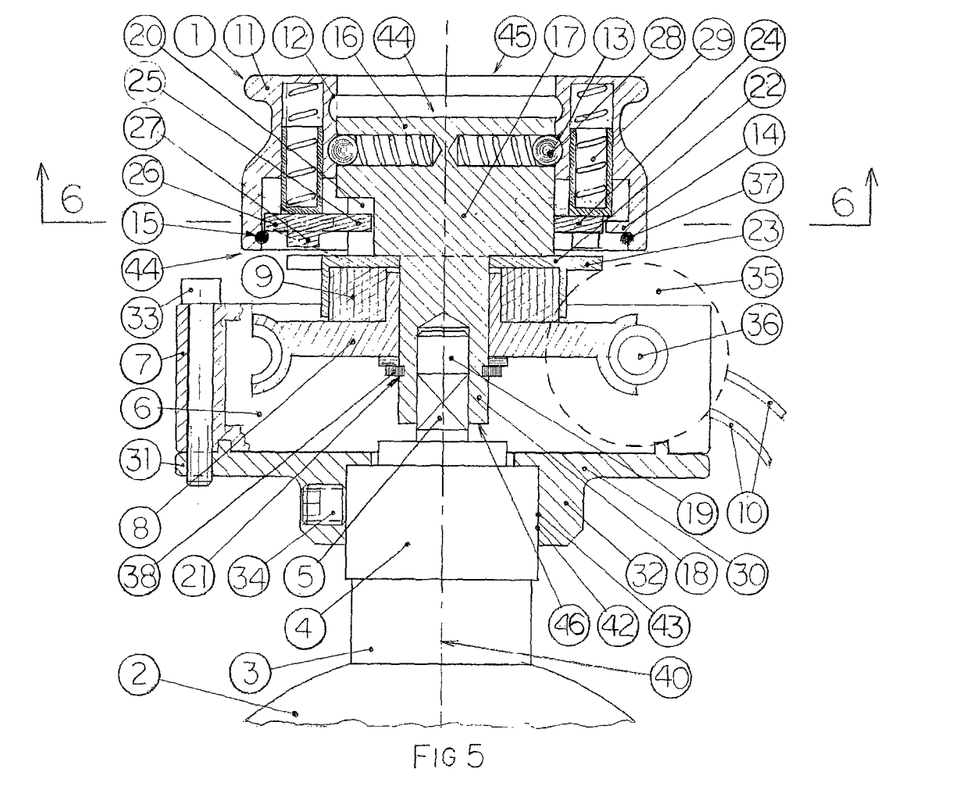
FIG. 5 is a cross-sectional view of an electronically controlled rotational actuator with manual override constructed in accordance with the principles of an embodiment of the present invention, configured in an electrically operated mode and in a second position.
Figure 6:
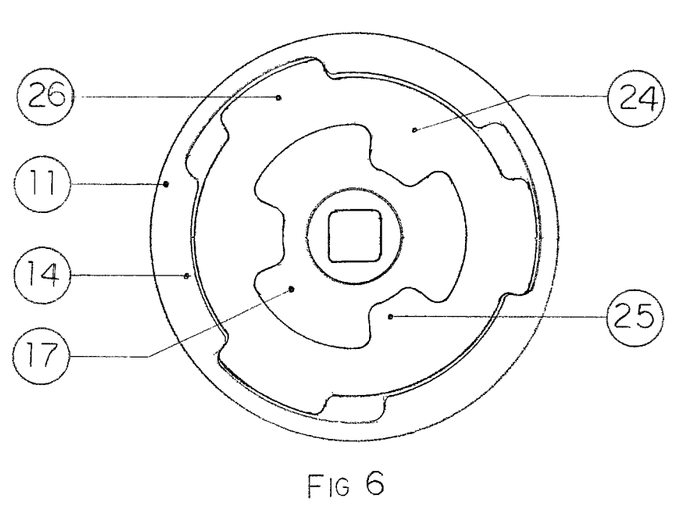
FIG. 6 is a cross-sectional view of the actuator of FIG. 5, taken generally along line 5-5.

With reference to FIGS. 5 and 6, the rotational actuator 1 is depicted in a front cross-sectional view, in electrically operated mode in a first position. In this position, tabs 23 of driving hub 22 and tabs 27 of connecting plate 24 are shown disengaged, in the process of configuring the unit from manual mode to electrically powered mode.

To configure the rotational actuator 1 from manual mode to electrically powered mode, housing 11 is manually pushed along axis 40 in the direction of valve 3 until, by engaging groove 12 of housing 11, spring loaded balls 28 locate housing 11 and spindle 16 in electrically powered mode configuration. During this proceeding, under pressure exerted on connecting plate 24 by spring loaded plungers 29, connecting plate 24 moves in the direction of valve 3, tabs 27 of connecting plate 24 come in contact with tabs 23 of driving hub 22, tabs 14 of housing 11 disengage from tabs 26 of connecting plate 24.

Figure 7:
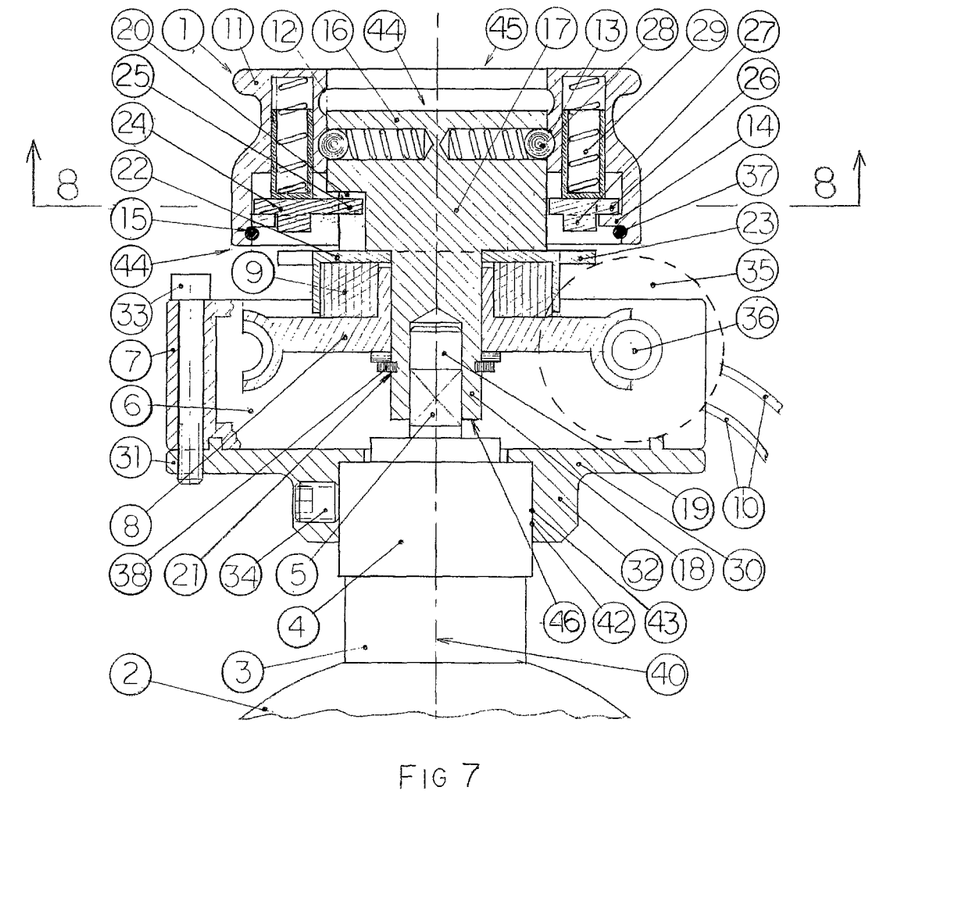
FIG. 7 is a cross-sectional view of an electronically controlled rotational actuator with manual override constructed in accordance with the principles of an embodiment of the present invention, configured in an electrically operated mode and in a first position.
Figure 8:
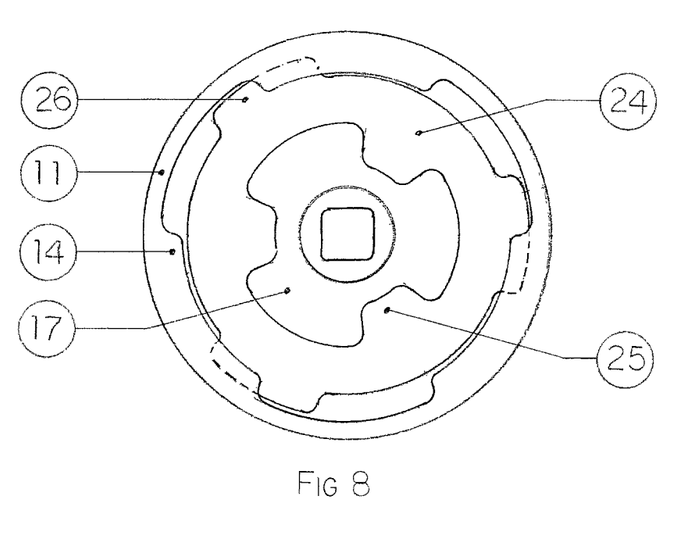
FIG. 8 is a cross-sectional view of the actuator of FIG. 7, taken generally along line 7-7.

With reference to FIGS. 7 and 8, the rotational actuator 1 is depicted in a front cross-sectional view, in electrically operated mode in a second position. In this position, tabs 23 of driving hub 22 and tabs 27 of connecting plate 24 are shown engaged. In this configuration, torque from gear-motor 6 is transmitted to spindle 16 via driving hub 22 and connecting plate 24.

As gear-motor motor 35 is electrically energized, driving hub 22 rotates, under pressure from plungers 29 applied to connecting plate 22, tabs 27 of connecting plate 24 engage tabs 23 of driving hub 22 when proper angular relation is achieved, driving hub 22 and connecting plate 24 becoming conjoined in rotation about axis 40.

To configure the actuator from electrically powered mode to manual mode, housing 11 is manually pulled along axis 40 in opposite direction of valve 3 until, by engaging in groove 13 of housing 11, spring loaded balls 28 locate housing 11 and spindle 16 in manual mode configuration. During this proceeding, tabs 14 of housing 11 come in contact with tabs 26 of connecting plate 24, moving connecting plate 24 away from driving hub 22, causing tabs 27 of connecting plate 24 to disengage with tabs 23 of driving hub.

As housing 11 is manually rotated, under pressure from spring loaded plungers 29 on connecting plate 24, tabs 26 of connecting plate 24 engage tabs 14 of housing 11 when proper angular relation is achieved, connecting plate 24 and housing 11 conjoining in rotation about axis 40. Snap-ring 37 keeps connecting plate 24 from sliding out of knob/housing 11.

Figure 9:
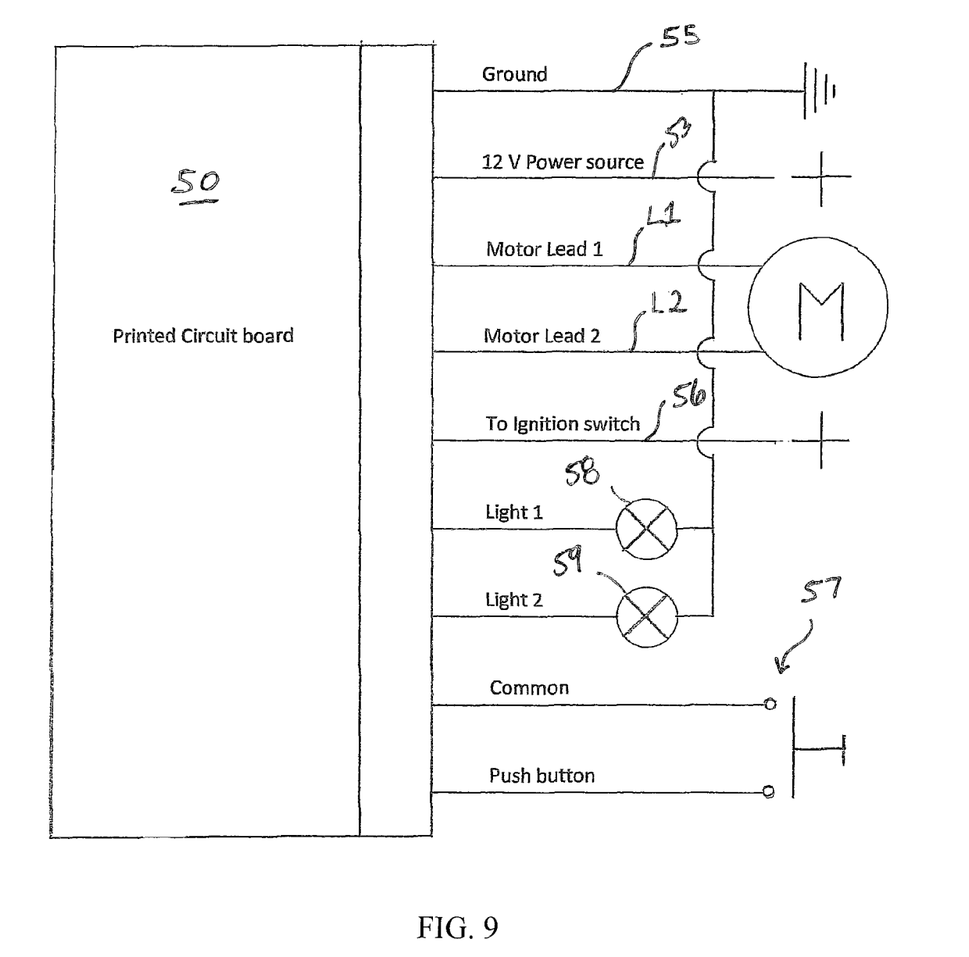
FIG. 9 is a diagrammatic illustration of an electronic controller.

With reference to FIG. 9, an electronic controller 50 is diagrammatically illustrated. In this exemplary application, the electronic controller 50 is connected to a permanent 12V source 53 protected by a fuse, ground 55, and a temporary 12V source 56 from the ignition switch of the vehicle. Connected to the module are motor leads L1 and L2, indicator lights 58 and 59, and a single pole single throw OFF (ON) switch 57.

Depressing switch 57 will cause the electronic controller 50 to allocate electricity from power source 53 to motor leads L1 and L2, initiating rotation of motor 35 in a first direction. Reaching the physical end of rotation cycle, spindle 16 will stop rotating and rubber coupling 9 will be compressed. Through motor leads L1 and L2, electronic controller 50 will sense the increase in current delivered to motor 35 and shut off motor 35 when reaching a pre-determined current level and energizing indicator light 48.

Depressing switch 57 again will cause the electronic controller to allocate electricity from power source 53 to motor leads L1 and L2, initiating rotation of motor 35 in a second direction, opposite of the first direction. At the end of the physical rotation, the spindle 16 will stop rotating and rubber coupling 9 will be compressed. Through motor leads L1 and L2, electronic controller 50 will sense the increase in current delivered to motor 35 and shut off motor 35 when reaching a pre-determined current level and energizing indicator light 49.

Each consecutive depression of switch 57 will initiate rotation of motor 35 in the opposite direction of the last direction in which it has rotated. Also, the indicator lights will be lit alternatively.

After turning ignition OFF electronic controller 50 will memorize the last direction in which the motor has rotated and corresponding indicator light will be reenergized after turning ignition ON again. In case rotation of motor 35 does not stop in the normal time taken to achieve a normal cycle, the controller will shut off the supply to the motor after a preset time expires and both lights will be lit, indicating malfunction. In case last motorized rotation was in first direction and the valve has been rotated manually in the second direction, next motorized rotation will be in second direction.

A number of embodiments of the present invention have been described. Nevertheless, it will be understood that various modifications may be made without departing from the spirit and scope of the invention. Accordingly, other embodiments are within the scope of the following claims.

The invention claimed is:

1. An electronically controlled rotational actuator comprising:
    a spindle having an axis of rotation;
    a driving hub rotatable about said axis of rotation;
    a connecting plate attached to said spindle to be axially movable and rotatably fixed thereto, said connecting plate rotatably fixed to said driving hub when in a first axial position, thereby rotatably fixing said spindle to said driving hub for conjoined rotation with said driving hub, said connecting plate rotatable relative to said driving hub when in a second axial position; and
    a housing connected to said spindle and axially moveably relative therewith, said housing rotatable relative to said spindle when in a first axial position of said housing, said housing rotatably fixed to said connecting plate and said driving hub when in a second axial position.

2. The actuator of claim 1, further comprising:
    an electric motor operatively connected to said driving hub and operating to rotate said driving hub about said axis of rotation.

3. An electronically controlled rotational actuator comprising:
    a spindle having an axis of rotation;
    a driving hub rotatable about said axis of rotation;
    a drive gear attached to said driving hub for conjoined rotation;
    a connecting plate attached to said spindle to be axially movable and rotatably fixed thereto, said connecting plate rotatably fixed to said driving hub when in a first axial position, thereby rotatably fixing said spindle to said driving hub for conjoined rotation with said driving hub, said connecting plate rotatable relative to said driving hub and rotatably fixed to said housing when in a second axial position;
    a housing connected to said spindle to be axially moveably relative thereto, said housing rotatable relative to said spindle when said connecting plate is in said first axial position, said housing rotatably fixed to said spindle when said connecting plate is in said second axial position; and
    wherein said connecting plate is in said first axial position when said housing is in a first axial position relative to said spindle, and wherein said connecting plate is in said second axial position when said housing is in a second axial position relative to said spindle.

4. The actuator of claim 3, further comprising:
    an electric motor operatively connected to said drive gear and operating to rotate said drive gear about said axis of rotation.

5. The actuator of claim 3, further comprising:
    one or more spring-biased ball dents carried by said spindle; and
    first and second radial grooves formed into said housing, wherein said one or more spring-biased ball dents are disposed within said first groove when said housing is in said first axial position relative to said spindle, and wherein said one or more spring-biased ball dents are disposed within said second groove when said housing is in said second axial position relative to said spindle.

6. The actuator of claim 3, wherein said connecting plate is spring biased into said first axial position when said housing is in said first axial position relative to said spindle.

7. An electronically controlled rotational actuator comprising:
    a spindle having an axis of rotation;
    a housing mounted for axial movement relative to said spindle between a first axial position and a second axial position, a connecting plate disposed within said housing and attached to said spindle to be axially movable and rotatably fixed thereto;

a driving hub rotatable about said axis of rotation;

an electric motor operatively connected to said driving hub and operating to rotate said driving hub about said axis of rotation;

wherein said connecting plate is rotatably fixed to said driving hub when said housing is in said first axial position thereby rotatably fixing said spindle to said driving hub for conjoined rotation with said driving hub;

wherein said housing is rotatable relative to said connecting plate and said spindle when said housing is in said first axial position, whereby said spindle is rotated about said axis of rotation by operating said motor;

wherein said connecting plate is rotatable relative to said driving hub when said housing is in said second axial position; and wherein said housing is rotatably fixed to said spindle when said housing is in said second axial position, whereby by said spindle is rotated about said axis of rotation by rotating said housing.

8. The actuator of claim 7, one or more spring-biased ball dents carried by said spindle; and first and second radial grooves formed into said housing, wherein said one or more spring-biased ball dents are disposed within said first groove when said housing is in said first axial position relative to said spindle, and wherein said one or more spring-biased ball dents are disposed within said second groove when said housing is in said second axial position relative to said spindle.

9. The actuator of claim 7, wherein said connecting plate is spring biased into engagement with said driving hub when said housing is in said first axial position.

10. The actuator of claim 7, wherein:

said connector plate has one or more axially extending tabs;

said driving hub as one or more radially extending tabs that are engaged with said one or more axially extending tabs when said connector plate is rotatably fixed to said driving hub.

11. The actuator of claim 7, further comprising:

one or more spring-biased ball dents carried by said spindle; and first and second radial grooves formed into said housing, wherein said one or more spring-biased ball dents are disposed within said first groove when said housing is in said first axial position, and wherein said one or more spring-biased ball dents are disposed within said second groove when said housing is in said second axial position.

* * * * *